United States Patent
Peters et al.

(10) Patent No.: US 10,246,576 B2
(45) Date of Patent: *Apr. 2, 2019

(54) SULFUR-CROSSLINKABLE RUBBER MIXTURE AND MOTOR VEHICLE TIRES

(71) Applicant: Continental Reifen Deutschland GmbH, Hannover (DE)

(72) Inventors: Fabian Peters, Hannover (DE); Thorsten Torbrügge, Langenhagen (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 24 days.

This patent is subject to a terminal disclaimer.

(21) Appl. No.: 15/024,968

(22) PCT Filed: Jul. 11, 2014

(86) PCT No.: PCT/EP2014/064881
§ 371 (c)(1),
(2) Date: Mar. 25, 2016

(87) PCT Pub. No.: WO2015/043790
PCT Pub. Date: Apr. 2, 2015

(65) Prior Publication Data
US 2016/0229992 A1    Aug. 11, 2016

Related U.S. Application Data

(63) Continuation of application No. PCT/EP2014/064881, filed on Jul. 11, 2014.

(30) Foreign Application Priority Data

Sep. 27, 2013   (DE) .................. 10 2013 110 720

(51) Int. Cl.
*C08L 7/00*     (2006.01)
*B60C 1/00*     (2006.01)
*B29B 7/74*     (2006.01)

(52) U.S. Cl.
CPC ............ *C08L 7/00* (2013.01); *B29B 7/7495* (2013.01); *B60C 1/00* (2013.01); *B60C 1/0016* (2013.01); *C08L 2312/00* (2013.01); *Y02T 10/862* (2013.01)

(58) Field of Classification Search
CPC ........................................................ C08L 7/00
See application file for complete search history.

(56) References Cited

U.S. PATENT DOCUMENTS

| | | | |
|---|---|---|---|
| 3,509,239 A * | 4/1970 | Tindall | C08L 21/00 525/211 |
| 3,692,756 A * | 9/1972 | St. Cyr | C08F 210/12 525/222 |
| 3,846,352 A | 11/1974 | Osborn et al. | |
| 9,034,980 B2 * | 5/2015 | Recker | B60C 1/0016 152/209.1 |
| 2010/0139825 A1 | 6/2010 | Hetzel | |
| 2010/0317800 A1 | 12/2010 | Pille-Wolf et al. | |
| 2011/0256395 A1 | 10/2011 | Zmarsly et al. | |
| 2012/0016056 A1 | 1/2012 | Miyazaki | |

FOREIGN PATENT DOCUMENTS

| | | |
|---|---|---|
| CN | 102245727 A | 11/2011 |
| CN | 103201335 A | 7/2013 |
| DE | 10 2008 062368 A1 | 6/2010 |
| EP | 2 452 972 A1 | 5/2013 |
| WO | 2013045482 | 4/2013 |
| WO | 2013045483 | 4/2013 |

OTHER PUBLICATIONS

CN Office action dated Nov. 1, 2016 of PCT application PCT/EP2014/064881 on which this application is based.

* cited by examiner

*Primary Examiner* — Vickey Nerangis
(74) *Attorney, Agent, or Firm* — David L. Cate

(57) ABSTRACT

A sulfur-crosslinkable rubber mixture includes from 40 to 100 phr of at least one natural and/or synthetic polyisoprene, and 15 phr or more of at least one hydrocarbon resin which is built up to the extent of 50 to 100 wt. % from aliphatic $C_5$ monomers and to the extent of 0 to 50 wt. % from further monomers, where the hydrocarbon resin according to formula I) has a Q of from 0.015 [° C.·mol/g] to 0.050 [° C.·mol/g]. Formula I) is defined as Q=softening point [° C.]/centrifuge average Mc [g/mol]. In some aspects, the sulfur-crosslinkable rubber mixture includes 15 to 300 phr of the hydrocarbon resin, or even from 36 to 100 phr of the hydrocarbon resin. The further monomer(s) is or are selected from the group of unsaturated compounds, which can be polymerized cationically, which includes aromatics and/or unsaturated terpenes and/or alkenes and/or cycloalkenes.

10 Claims, No Drawings

SULFUR-CROSSLINKABLE RUBBER MIXTURE AND MOTOR VEHICLE TIRES

CROSS REFERENCE TO RELATED APPLICATIONS

This application is a continuation application of international patent application PCT/EP2014/064881, filed Jul. 11, 2014, designating the United States and claiming priority from German application 10 2013 110 720.6, filed Sep. 27, 2013, and the entire content of these applications is incorporated herein by reference.

FIELD OF THE INVENTION

The invention relates to a sulfur-crosslinkable rubber blend, in particular for treads of vehicle pneumatic tires, and a vehicle pneumatic tire.

BACKGROUND

Resins, in particular hydrocarbon resins, are additives which have been known for a long time for rubber mixtures for treads of vehicle pneumatic tires. They serve above all as processing auxiliaries and cause the necessary green tack of the rubber mixtures. Furthermore, certain vulkanizate properties, such as hardness, modulus and swelling properties, can be influenced by resins. They can also be employed as vulcanization resins or adhesion promoters. Typical bonding resins employed in the rubber industry are e.g. petroleum resins, terpene resins, colophony resins, phenol-formaldehyde resins and coumarone-indene resins. Aliphatic resins from monomers of the C5 crude oil fraction or C5-containing copolymers are known as additives for rubber mixtures.

WO 2006/061064 A1 thus describes the use of from 5 to 35 phr of a $C_5$/vinylaromatic copolymer in combination with 5 to 35 phr of MES or TDAE oil in a rubber mixture, wherein a rubber mixture with a polymer blend comprising styrene/butadiene rubber and butadiene rubber is disclosed.

EP 1707595 B1 discloses a rubber mixture for a side reinforcing layer or a bed apex which comprises 1 to 20 phr of a $C_5$-based petroleum resin.

EP 0978533 B1 discloses a rubber mixture which comprises 21.5 phr of a hydrocarbon resin from 2-methyl-2-butene and 1,3-pentadiene and dicyclopentadiene in combination with 100 phr of styrene/butadiene rubber.

However, in the prior art limits are imposed on the use of relatively large amounts of resin due to the limited solubility in the polymer system of the particular rubber mixture.

SUMMARY

This section provides a general summary of the disclosure, and is not a necessarily a comprehensive disclosure of its full scope or all of its features.

In a first embodiment of the disclosure, a sulfur-crosslinkable rubber mixture is provided which includes from 40 to 100 phr of at least one natural and/or synthetic polyisoprene, and 15 phr or more of at least one hydrocarbon resin which is built up to the extent of 50 to 100 wt. % from aliphatic $C_5$ monomers and to the extent of 0 to 50 wt. % from further monomers, where the hydrocarbon resin according to formula I) has a Q of from 0.015 [° C.·mol/g] to 0.050 [° C.·mol/g]. Formula I) is defined as Q=softening point ['C]/centrifuge average Mc [g/mol]. In some aspects, the sulfur-crosslinkable rubber mixture includes 15 to 300 phr of the hydrocarbon resin, or even from 36 to 100 phr of the hydrocarbon resin. The further monomer(s) is or are selected from the group of unsaturated compounds, which can be polymerized cationically, which includes aromatics and/or unsaturated terpenes and/or alkenes and/or cycloalkenes. In some aspects, the further monomer(s) is or are selected from the group of alpha-methylstyrene and/or styrene and/or vinyltoluene and/or indene and/or coumarone and/or methylindene and/or methylcoumarone and/or phenol and/or olefins.

The hydrocarbon resin used in embodiments of the disclosure may have a softening point according to ASTM E 28 (ring and ball) of from 60 to 99° C. The hydrocarbon resin may have a molecular weight Mw (weight average) of from 500 to 4,000 g/mol and a centrifuge average Mc of from 2,500 to 10,000 g/mol. In some cases, the sulfur-crosslinkable rubber mixture may include 10 to 300 phr of at least one silica.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, or refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or an are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising,"

"having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The invention is based on the object of providing a sulfur-crosslinkable rubber mixture which, starting from the prior art, shows a further improvement in the target conflict of rolling resistance properties versus wet grip properties with simultaneously improved or at least the same tear properties.

The object is achieved according to the invention in that the sulfur-crosslinkable rubber mixture comprises at least the following constituents:

40 to 100 phr of at least one natural and/or synthetic polyisoprene, and 15 phr or more of at least one hydrocarbon resin which is built up to the extent of 50 to 100 wt. % from aliphatic $C_5$ monomers and to the extent of 0 to 50 wt. % from further monomers, wherein the hydrocarbon resin according to formula I) has a Q of from 0.015 [° C.·mol/g] to 0.05 [° C.·mol/g]:

$Q$=softening point [° C.]/centrifuge average $Mc$ [g/mol]   I)

It is clear to the person skilled in the art that hydrocarbon resins are polymers which are built up from monomers, wherein the hydrocarbon resin is built up formally from derivatives of the monomers by linking of the monomers to one another.

Surprisingly, the rubber mixture according to the invention lies at a higher performance level compared with the prior art with respect to the indicators for rolling resistance and wet grip. In particular, the rubber mixture according to the invention surprisingly has a marked shift in the glass transition temperature, starting from the glass transition temperature of the natural and/or synthetic polyisoprene, even at comparatively high amounts of the hydrocarbon resin of 30 phr or more. This indicates a surprisingly good solubility of the hydrocarbon resin in natural and/or synthetic polyisoprene.

The stated phr (parts per hundred parts of rubber by weight) used in this specification is in this context the conventional stated amount in the rubber industry for mixture recipes. The dosage of the parts by weight of the individual substances in this context is always based on 100 parts by weight of the total weight of all the rubbers present in the mixture.

The abovementioned hydrocarbon resins are not regarded as rubber in the context of this invention.

The rubber mixture according to the invention comprises 40 to 100 phr, preferably 50 to 100 phr, particularly preferably 60 to 100 phr, very particularly preferably 70 to 100 phr, very particularly preferably again 80 to 100 phr, of at least one natural and/or synthetic polyisoprene. This is to be understood as meaning that the rubber mixture can comprise at least one natural polyisoprene in the amounts mentioned or at least one synthetic polyisoprene in the amounts mentioned or a mixture of at least one natural and at least one synthetic polyisoprene, wherein in the latter case the amounts mentioned are the total amount of natural and synthetic polyisoprene.

The natural polyisoprene and/or synthetic polyisoprene can be all the types known to the person skilled in the art. In this context it can be both cis-1,4-polyisoprene and 3,4-polyisoprene. Nevertheless, the use of cis-1,4-polyisoprenes having a cis-1,4 content of greater than 90 wt. % is preferred. On the one hand such a polyisoprene can be obtained by stereospecific polymerization in solution with Ziegler-Natta catalysts or using finely divided lithiumalkyls. On the other hand natural rubber (NR) is such a cis-1,4-polyisoprene; the cis-1,4 content in natural rubber is greater than 99 wt. %. The natural and/or synthetic polyisoprene can be modified by means of groups known in the prior art; the natural polyisoprene can thus also be, for example, epoxidized natural rubber.

In a preferred embodiment of the invention the rubber mixture comprises 40 to 100 phr, preferably 50 to 100 phr, particularly preferably 60 to 100 phr, very particularly preferably 70 to 100 phr, very particularly preferably again 80 to 100, further particularly preferably 100 phr of at least one natural polyisoprene (natural rubber).

The rubber mixture according to the invention comprises 15 phr or more, preferably 15 to 300 phr, particularly preferably 15 to 150 phr, very particularly preferably 25 to 100 phr, very particularly preferably again 36 to 100 phr, very particularly preferably again 40 to 100 phr, very particularly preferably again 45 to 100 phr, very particularly preferably again 45 to 75 phr, of at least one hydrocarbon resin which is built up to the extent of 50 to 100 wt. % (percent by weight, based on the total weight of the hydrocarbon resin) from aliphatic $C_5$ monomers and to the extent of 0 to 50 wt. % from further monomers. It is conceivable here that the hydrocarbon resin is built up from one or several different aliphatic $C_5$ monomers and from one or several different further monomers. It is furthermore e.g. also conceivable that the rubber mixture according to the invention comprises a mixture of different hydrocarbon resins having the features mentioned.

Preferably, the hydrocarbon resin is built to the extent of 55 to 100 wt. % from aliphatic $C_5$ monomers. According to Römpp Online Lexikon, version 3.36 "aliphatic compounds" is a "collective name [ . . . ] for functionalized or non-functionalized organic compounds which contain no aromatic ring system."

The aliphatic C5 monomers can be monomers of the C5 crude oil fraction, e.g. isoprene, and/or monomers of the terpenes and/or cycloolefins and/or olefins, such as e.g. pentene. C5 is to be understood as meaning that these monomers are built up from five carbon atoms.

Furthermore, it is known to the person skilled in the art that the C5 crude oil fraction can comprise, apart from aliphatic monomers having five carbon atoms, other aliphatic monomers (units) having e.g. four, that is to say C4 monomers, or six carbon atoms, C6 monomers.

For simplicity, in the context of the present invention these, that is to say C4 and C6 monomers, are mentioned under the further monomers and are called aliphatic unsaturated C4 monomers or, respectively, aliphatic unsaturated C6 monomers.

The aliphatic C5 monomer(s) are selected from the group comprising isoprene and/or trans-1,3-pentadiene and/or cis-1,3-pentadiene and/or 2-methyl-2-butene and/or 1-pentene and/or 2-pentene.

According to a preferred development of the invention, the aliphatic C5 monomers is or are selected from the group consisting of isoprene and/or trans-1,3-pentadiene and/or cis-1,3-pentadiene and/or 2-methyl-2-butene and/or 1-pentene and/or 2-pentene.

The further monomer(s) are selected from the group of unsaturated compounds, which can be polymerized cationically, comprising aromatics and/or terpenes and/or alkenes and/or cycloalkenes, wherein the aliphatic monomers having more or fewer than five carbon atoms described above which are contained in the C5 crude oil fraction likewise fall under the further monomers.

The aromatics can be, for example, alpha-methylstyrene and/or styrene and/or vinyltoluene and/or indene and/or coumarone and/or methylindene and/or methylcoumarone and/or phenol.

According to Römpp Online Lexikon, version 3.36 the term "olefins" is the "group name for acyclic and cyclic aliphatic hydrocarbons having one or more reactive C,C double bonds in the molecule, which nowadays are better called alkenes and, respectively, cycloalkenes, in the broader sense also a name for substituted derivatives thereof . . . ." In the context of the present invention unsaturated terpenes, alkenes and cycloalkenes are therefore combined under the generic term olefins.

The alkenes can be, for example, 1-butene and/or 2-butene and/or butadiene.

The further monomer(s) is or are thus selected from the group comprising alpha-methylstyrene and/or styrene and/or vinyltoluene and/or indene and/or coumarone and/or methylindene and/or methylcoumarone and/or phenol and/or olefins, such as unsaturated terpenes and/or alkenes, such as e.g. 1-butene and/or 2-butene and/or butadiene.

Preferably, the further monomer(s) is or are selected from the group consisting of alpha-methylstyrene and/or styrene and/or vinyltoluene and/or indene and/or coumarone and/or methylindene and/or methylcoumarone and/or phenol and/or olefins, such as e.g. 1-butene and/or 2-butene and/or butadiene. Particularly preferably, the further monomer(s) is or are selected from the group consisting of alpha-methylstyrene and/or styrene and/or vinyltoluene and/or indene and/or coumarone and/or methylindene and/or methylcoumarone and/or phenol and/or aliphatic unsaturated C4 monomers, such as e.g. 1-butene and/or 2-butene and/or butadiene, and/or aliphatic unsaturated C6 monomers.

The vinyltoluene (also ar-methylstyrene) can be p-vinyltoluene and/or m-vinyltoluene and/or o-vinyltoluene.

The hydrocarbon resin can be a homopolymer or a copolymer. In the present application homopolymer is understood as meaning a polymer which, according to Römpp Online version 3.28, "is formed from monomers of only one type". In the context of the present invention copolymer is understood as meaning a polymer which is built up from several, i.e. two or more, different monomers. In the context of the present invention the hydrocarbon resin can therefore e.g. also be a copolymer from three different monomers.

In a preferred embodiment of the invention the hydrocarbon resin is built up to the extent of 55 to 65 wt. %, preferably 58 to 62 wt. % from aliphatic $C_5$ monomers and to the extent of 35 to 45 wt. %, preferably 38 to 42 wt. % from further monomers. With at least one such hydrocarbon resin particularly good wet grip properties are achieved in the rubber mixture according to the invention, the rolling resistance indicators remaining at a good level or even likewise being improved.

In a further preferred embodiment of the invention the hydrocarbon resin is built up to the extent of 95 to 100 wt. %, preferably 100 wt. %, from aliphatic $C_5$ monomers and to the extent of 0 to 5 wt. % from C4 or C6 monomers contained in the crude oil fraction monomers. With at least one such hydrocarbon resin particularly good rolling resistance indicators are achieved in the rubber mixture according to the invention, the wet grip properties remaining at a good level or even likewise being improved.

The hydrocarbon resin contained in the rubber mixture according to the invention has a softening point according to ASTM E 28 (ring and ball) of from 60 to 200° C., preferably 60 to 150° C., particularly preferably 60 to 120° C., very particularly preferably 60 to 99° C., and very particularly preferably again 80 to 99° C.

Furthermore, the hydrocarbon resin contained in the rubber mixture according to the invention preferably has a molecular weight Mw (weight average) of from 500 to 4,000 g/mol, particularly preferably 1,000 to 3,000 g/mol, very particularly preferably 1,300 to 2,500 g/mol, particularly preferably again 1,500 to 2,200 g/mol, very particularly preferably again 1,500 to 1,900 g/mol.

Furthermore, the hydrocarbon resin contained in the rubber mixture according to the invention preferably has a molecular weight Mc (centrifuge average) of from 2,500 to 10,000 g/mol, particularly preferably 2,500 to 5,000 g/mol, very particularly preferably 3,000 to 4,500 g/mol, particularly preferably again 3,200 to 4,300 g/mol, very particularly preferably again 3,400 to 4,100 g/mol.

The determination of the molecular weight (weight average Mw and centrifuge average Mc) is carried out by means of gel permeation chromatography in accordance with DIN 55672-1 (GPC with tetrahydrofuran as the eluting agent, polystyrene standard; SEC=size exclusion chromatography).

According to a preferred development of the invention the hydrocarbon resin is built up to the extent of 95 to 100 wt. %, preferably 100 wt. %, from aliphatic C5 monomers and to the extent of 0 to 5 wt. % from C4 or C6 monomers contained in the crude oil fraction, and has an Mw of from 1,500 to 2,200 g/mol, very particularly preferably again 1,500 to 1,900 g/mol, and an Mc of from 3,200 to 4,300 g/mol, very particularly preferably again 3,400 to 4,100 g/mol. With at least one such hydrocarbon resin particularly good rolling resistance indicators are achieved in the rubber mixture according to the invention, a surprisingly good solubility in natural and/or synthetic polyisoprene, preferably natural polyisoprene, resulting, which can be seen e.g. from the shift in the glass transition temperature starting from the polyisoprene.

The hydrocarbon resin contained in the rubber mixture according to the invention has a softening point which is as high as possible at a centrifuge average Mc of the molecular weight which is as low as possible.

If this is expressed in a quotient Q according to formula I):

$$Q = \text{softening point [° C.]/centrifuge average } Mc \text{ [g/mol],} \qquad \text{I)}$$

that is to say Q is the softening point divided by the centrifuge average,

Q is 0.015 [° C.·mol/g] to 0.050 [° C.·mol/g], preferably 0.020 [° C.·mol/g] to 0.040 [° C.·mol/g], particularly preferably 0.020 [° C.·mol/g] to 0.035 [° C.·mol/g], very particularly preferably 0.022 [° C.·mol/g] to 0.030 [° C.·mol/g] and very particularly preferably again 0.024 [° C.·mol/g] to 0.028 [° C.·mol/g].

It has emerged that with a hydrocarbon resin which meets these conditions a surprisingly good improvement is achieved in the rubber mixture compared with the prior art with respect to the target conflict of rolling resistance properties and wet grip properties. Surprisingly, this improvement is achieved even with very high amounts of the hydrocarbon resin of 25 phr or more, preferably 30 phr or more, particularly preferably 36 phr or more, very particularly preferably 36 to 100 phr, very particularly preferably again 40 to 100 phr, very particularly preferably again 45 to 100 phr, very particularly preferably again 45 to 75 phr. This could be explained inter alia by a surprisingly good solubility of the hydrocarbon resin in the natural and/or synthetic polyisoprene, preferably in natural polyisoprene.

Particularly preferably, the hydrocarbon resin here has a softening point of from 80 to 99° C., particularly preferably again from 85 to 99° C., further particularly preferably again from 90 to 99° C.

Preferably, the hydrocarbon resin here has a centrifuge average Mc of from 2,500 to 10,000 g/mol, particularly preferably from 2,500 to 5,000 g/mol, particularly preferably again from 3,000 to 4,500 g/mol further particularly preferably again from 3,200 to 4,300 g/ml, very particularly preferably again from 3,400 to 4,100 g/mol.

Such hydrocarbon resins are obtainable e.g. under the trade name Piccotac™ 1095 (softening point=94° C., centrifuge average Mc=3,500 g/mol, Q=0.0269 [° C.·mol/g]) or Piccotac™ 6095-E (softening point=98° C., centrifuge average Mc=4,000 g/mol, Q=0.0245 [° C.·mol/g]) from Eastman Chemical Company.

As stated above, the rubber mixture according to the invention comprises 40 to 100 phr of at least one natural and/or synthetic polyisoprene. The rubber mixture according to the invention thus comprises, if it comprises less than 100 phr of polyisoprene, at least one further rubber in amounts of from 0 to 60 phr, preferably 0 to 50 phr, particularly preferably 0 to 40 phr, very particularly preferably 0 to 30 phr, very particularly preferably again 0 to 20 phr, but at least 0.1 phr.

The at least one further rubber here is selected from the group consisting of butadiene rubber and/or solution-polymerized styrene/butadiene rubber and/or emulsion-polymerized styrene/butadiene rubber and/or liquid rubbers having a molecular weight Mw of greater than 25,000 20,000/mol and/or halobutyl rubber and/or polynorbornene and/or isoprene/isobutylene copolymer and/or ethylene/propylene/diene rubber and/or nitrile rubber and/or chloroprene rubber and/or acrylate rubber and/or fluororubber and/or silicone rubber and/or polysulfide rubber and/or epichlorohydrin rubber and/or styrene/isoprene/butadiene terpolymer and/or hydrogenated acrylonitrile/butadiene rubber and/or isoprene/butadiene copolymer and/or hydrogenated styrene/butadiene rubber, wherein the rubbers can be modified. The modification can be one with hydroxyl groups and/or ethoxy groups and/or epoxide groups and/or siloxane groups and/or amino groups and/or aminosiloxane and/or carboxyl groups and/or phthalocyanine groups and/or silane sulfide groups. However, further modifications known to the person skilled in the art, also called functionalizations, are also possible. Metal atoms can be a constituent of such functionalizations.

In particular, nitrile rubber, hydrogenated acrylonitrile/butadiene rubber, chloroprene rubber, butyl rubber, halobutyl rubber or ethylene/propylene/diene rubber are employed in the production of industrial rubber articles, such as belts, straps and hoses.

Particularly preferably, the further rubber is a diene rubber and is selected from the group consisting of butadiene rubber and styrene/butadiene rubber.

The butadiene rubber (=BR, polybutadiene) can be all the types known to the person skilled in the art. These include, inter alia, the so-called high-cis and low-cis types, polybutadiene having a cis content of greater than or equal to 90 wt. % being called a high-cis type and polybutadiene having a cis content of less than 90 wt. % being called a low-cis type. A low-cis polybutadiene is e.g. Li—BR (lithium-catalyzed butadiene rubber) having a cis content of from 20 to 50 wt. %. Particularly good abrasion properties of the rubber mixture are achieved with a high-cis BR.

The polybutadiene employed can be modified with end groups, as described above.

The rubber mixture according to the invention furthermore comprises, in particular for the use in vehicle pneumatic tires, preferably 10 to 300 phr, preferably 30 to 300 phr, particularly preferably 30 to 150 phr, of at least one filler. These can be all the fillers known to the person skilled in the art, such as silica, alumosilicates, carbon black, carbon nanotubes, chalk, starch, magnesium oxide, titanium dioxide or rubber gels.

Preferably, the rubber mixture comprises at least one silica and/or at least one carbon black as a filler.

In this context, all the carbon black types known to the person skilled in the art are conceivable. Preferably, however, a carbon black which has an iodine adsorption number according to ASTM D 1510 of from 30 to 180 g/kg, preferably 40 to 180 g/kg, particularly preferably 40 to 130 kg/g, and a DBP number according to ASTM D 2414 of from 80 to 200 ml/100 g, preferably 100 to 200 ml/100 g, particularly preferably 100 to 180 ml/100 g, is employed. With this, rolling resistance indicators (rebound resilience at 70° C.) and abrasion and/or tear properties which are particularly good for use in vehicle tires are achieved.

The silicas can be the silicas which are known to the person skilled in the art and are suitable as a filler for tire rubber mixtures. It is particularly preferable, however, for a finely divided, precipitated silica which has a nitrogen surface area (BET surface area) (according to DIN ISO 9277 and DIN 66132) of from 35 to 350 m$^2$/g, preferably from 35 to 260 m$^2$/g, particularly preferably from 100 to 260 m$^2$/g and very particularly preferably from 115 to 235 m$^2$/g, and a CTAB surface area (according to ASTM D 3765) of from 30 to 400 m$^2$/g, preferably from 30 to 250 m$^2$/g, particularly preferably from 100 to 250 m$^2$/g and very particularly preferably from 110 to 230 m$^2$/g, to be used. Such silicas lead e.g. in rubber mixtures for tire treads to particularly good physical properties of the vulcanizates. Moreover, in this context advantages may result in the processing of the mixture by a reduction in the mixing time with constant product properties, leading to an improved productivity. Silicas which can be employed are thus e.g. both those of the Ultrasil® VN3 (trade name) type from Evonik and highly dispersible silicas, so-called HD silicas (e.g. Zeosil® 1165 MP from Rhodia).

To improve the processability and to bind the silica and other polar fillers which may be present to the diene rubber, silane coupling agents can be employed in rubber mixtures. One or several different silane coupling agents in combination with one another can be employed here. The rubber mixture can thus comprise a mixture of different silanes.

The silane coupling agents react with the silanol groups on the surface of the silica or other polar group during mixing of the rubber or the rubber mixture (in situ) or even before the addition of the filler to the rubber in the sense of a pretreatment (premodification). Silane coupling agents which can be used in this context are all the silane coupling agents known to the person skilled in the art for use in rubber mixtures. Such coupling agents known from the prior art are bifunctional organosilanes which have at least one alkoxy, cycloalkoxy or phenoxy group as a leaving group on the silicon atom and which have a group as another functionality which can optionally undergo a chemical reaction with the double bonds of the polymer after cleavage. The latter group can be e.g. the following chemical groups:

—SCN, —SH, —NH$_2$ or —Sx—(where x=2 to 8).

Silane coupling agents which can be used are thus e.g. 3-mercaptopropyltriethoxysilane, 3-thiocyanatopropyltrimethoxysilane or 3,3'-bis(triethoxysilylpropyl) polysulfides having 2 to 8 sulfur atoms, such as e.g. 3,3'-bis(triethoxysilylpropyl) tetrasulfide (TESPT), the corresponding disulfide (TESPD) or also mixtures of the sulfides having 1 to 8 sulfur atoms with different contents of the various sulfides. TESPT can also be added in this context, for example, as a mixture with industrial carbon black (trade name X50S® from Evonik). Preferably, a silane mixture which comprises disulfides to the extent of 40 to 100 wt. %, particularly preferably 55 to 85 wt. % of disulfides and very particularly preferably 60 to 80 wt. % of disulfides, is employed. Such a mixture is obtainable e.g. under the trade name Si 261® from Evonik, which is described e.g. in DE 102006004062 A1.

Blocked mercaptosilanes such as are known e.g. from WO 99/09036 can also be employed as the silane coupling agent. Silanes such as are described in WO 2008/083241 A1, WO 2008/083242 A1, WO 2008/083243 A1 and WO 2008/083244 A1 can also be employed. Silanes e.g. which are marketed under the name NXT in various variants by Momentive, USA or those which are marketed under the name VP Si 363® by Evonik Industries can be used.

According to a preferred embodiment of the invention silica is present as the sole or main filler, that is to say the amount of silica is significantly greater than the amount of other fillers which may be present. With silica as the sole filler or main filler particularly good rolling resistance indicators are achieved in the rubber mixture according to the invention, in particular for use in the tread of vehicle pneumatic tires, the other tire properties, such as wet braking and/or abrasion properties and/or handling properties and/or the tear properties being at a good level or even improved. The amount of silica here is 10 to 300 phr, preferably 50 to 250 phr, particularly preferably 50 to 180 phr, very particularly preferably 50 to 150 phr, very particularly preferably again 50 to 130 phr. It is conceivable here that the rubber mixture moreover comprises 0.1 to 30 phr, preferably 2 to 30 phr, particularly preferably 2 to 10 phr of at least one carbon black.

According to a preferred embodiment of the invention the rubber mixture comprises 50 to 70 phr of at least one silica. According to a further preferred embodiment of the invention the rubber mixture comprises 105 to 135 phr of at least one silica.

According to a further preferred embodiment of the invention carbon black is present as the sole filler or as the main filler, that is to say the amount of carbon black is significantly greater than the amount of other fillers which may be present. With carbon black as the sole filler or main filler a particularly good abrasion resistance is achieved in the rubber mixture according to the invention, in particular for use in the tread of vehicle pneumatic tires, the other tire properties, such as wet braking and/or rolling resistance properties and/or handling properties and/or the tear properties being at a good level or even improved. The amount of carbon black here is 10 to 300 phr, preferably 50 to 250 phr, particularly preferably 50 to 180 phr, very particularly preferably 50 to 150 phr, very particularly preferably again 50 to 130 phr. In the case where a further filler is present in addition to carbon black, this is preferably silica. It is thus also conceivable that the rubber mixture according to the invention comprises carbon black and silica in similar amounts, such as e.g. 20 to 100 phr of carbon black in combination with 20 to 100 phr of silica.

However, it is also conceivable that the rubber mixture moreover comprises, in addition to carbon black as the main filler, 0.1 to 30 phr, preferably 2 to 30 phr, particularly preferably 2 to 10 phr of at least one silica.

0 to 70 phr, preferably 0.1 to 60 phr, preferably 0.1 to 50 phr, of at least one plasticizer can also be present in the rubber mixture. These include all the plasticizers known to the person skilled in the art, such as aromatic, naphthenic or paraffinic mineral oil plasticizers, such as e.g. MES (mild extraction solvate) or TDAE (treated distillate aromatic extract) or naphthenic process oils by hydrogenation as described, for example, in EP 2357219 A1, or rubber-to-liquid oils (RTL) or biomass-to-liquid oils (BTL) or factices or plasticizer resins or liquid polymer (such as liquid BR), the average molecular weight Mw of which (determination by GPC=gel permeation chromatography in accordance with BS ISO 11344:2004) is between 500 and 20,000 g/mol. If liquid polymers are employed as plasticizers in the rubber mixture according to the invention, these are not included as rubber in the calculation of the composition of the polymer matrix.

If mineral oil is used, this is preferably selected from the group consisting of DAE (distillate aromatic extracts) and/or RAE (residual aromatic extract) and/or TDAE (treated distillate aromatic extracts) and/or MES (mild extracted solvents) and/or naphthenic oils.

Furthermore, the rubber mixture according to the invention can comprise conventional additives in conventional parts by weight. These additives include a) antiageing agents, such as e.g.
N-phenyl-N'-(1,3-dimethylbutyl)-p-phenylenediamine (6PPD),
N,N'-diphenyl-p-phenylenediamine (DPPD),
N,N'-ditolyl-p-phenylenediamine (DTPD),
N-isopropyl-N'-phenyl-p-phenylenediamine (IPPD),
2,2,4-trimethyl-1,2-dihydroquinoline (TMQ), b) activators, such as e.g. zinc oxide and fatty acids (e.g. stearic acid), c) waxes, d) further resins, in particular bonding resins which do not fall under the abovementioned aromatic hydrocarbon resins, e) mastication auxiliaries, such as e.g. 2,2'-dibenzamidodiphenyl disulfide (DBD), and f) processing auxiliaries, such as e.g. fatty acid salts, such as e.g. zinc soaps, and fatty acid esters and derivatives thereof.

In particular in the use of the rubber mixture according to the invention for the internal components of a tire or of an industrial rubber article which have direct contact to the reinforcing supports present, a suitable adhesive system, often in the form of bonding resins, is as a rule also added to the rubber mixture.

The amount content of the total amount of further additives is 3 to 150 phr, preferably 3 to 100 phr and particularly preferably 5 to 80 phr.

The total amount of the further additives also includes 0.1 to 10 phr, preferably 0.2 to 8 phr, particularly preferably 0.2 to 4 phr, of zinc oxide (ZnO).

This can be all types of zinc oxide known to the person skilled in the art, such as e.g. ZnO granules or powder. The zinc oxide conventionally used has as a rule a BET surface area of less than 10 m²/g. However, so-called nano-zinc oxide having a BET surface area of from 10 to 60 m²/g can also be used.

The vulcanization is carried out in the presence of sulfur or sulfur donors with the aid of vulcanization accelerators, it being possible for some vulcanization accelerators to act as sulfur donors at the same time. Sulfur or sulfur donors and one or more accelerators are added to the rubber mixture in the amounts mentioned during the last mixing step. In this context the accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators. The use of a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenemorpholide (MBS) and/or N-tert-butyl-2-benzothiazylsulfenamide (TBBS) is preferred.

In a preferred embodiment of the invention the rubber mixture comprises CBS as an accelerator. Particularly good tear properties of the rubber mixture are achieved by this means.

Further network-forming systems such as are obtainable, for example, under the trade names Vulkuren®, Duralink® or Perkalink®, or network-forming systems such as are described in WO 2010/049261 A2 can be employed in the rubber mixture. This system comprises a vulcanizing agent which crosslinks with a functionality of greater than four and at least one vulcanization accelerator. The vulcanizing agent which crosslinks with a functionality of greater than four has, for example, the general formula A):

$$G[C_aH_{2a}—CH_2—S_bY]_c \qquad A)$$

wherein G is a polyvalent cyclic hydrocarbon group and/or a polyvalent heterohydrocarbon group and/or a polyvalent siloxane group which comprises 1 to 100 atoms; wherein each Y independently selected from a rubber-active group, comprises sulfur-containing functionalities; and wherein a, b and c are integers for which, independently: a is 0 to 6; b is 0 to 8; and c is 3 to 5.

The rubber-active group is preferably selected from a thiosulfonate group, a dithiocarbamate group, a thiocarbonyl group, a mercapto group, a hydrocarbon group and a sodium thiosulfonate group (colored salt group).

Very good abrasion and tear properties of the rubber mixture according to the invention are achieved with these.

Moreover, vulcanization retardants can be present in the rubber mixture.

A further object of the present invention is to provide a vehicle pneumatic tire which, starting from the prior art, is distinguished by a further improvement in the target conflict of rolling resistance properties versus wet grip properties. This object is achieved in that the vehicle pneumatic tire comprises the rubber mixture according to the invention as described above in at least one component. In this context all the statements given above for the constituents and features thereof apply.

Preferably, the component is a tread. As is known to the person skilled in the art, the tread contributes to the overall rolling resistance of the tire to a relatively high proportion. Furthermore, the safety of the vehicle pneumatic tire during driving depends substantially on the wet grip properties, in particular the wet braking properties, of the tread.

However, it is also moreover conceivable that the vehicle pneumatic tire comprises the rubber mixture in at least one other outer and/or internal component, a so-called body component, such as the side wall, inner liner (inner layer), squeegee, core profile, belt, shoulder, belt profile, carcass, heel reinforcer, heel profile, horn profile and binding.

The preparation of the rubber mixture according to the invention is carried out by the conventional process in the rubber industry, in which a base mixture having all the constituents apart from the vulcanization system (sulfur and vulcanization-influencing substances) is first prepared in one or more mixing steps. The finished mixture s produced by addition of the vulcanization system in a last mixing step. The finished mixture is further processed e.g. by an extrusion operation and brought into the appropriate form.

For use in vehicle pneumatic tires the mixture is preferably brought into the form of a tread and applied as is known during the production of the vehicle tire blank. However, the tread can also be wound in the form of a narrow strip of rubber mixture onto a tire blank. In the case of treads divided into two (upper part: cap and lower part: base) the rubber mixture according to the invention can be used both for the cap and for the base. The preparation of the rubber mixture according to the invention for use as a body mixture in vehicle pneumatic tires is carried out as already described for the tread. The difference lies in the shaping after the extrusion operation. The forms obtained in this way from the rubber mixture for one or more different body mixtures then serve for building up a tire blank.

The invention is now to be explained in more detail with the aid of comparative and embodiment examples, which are summarized in Table 1.

The comparison mixtures are identified with C, the mixtures according to the invention are identified with E.

The preparation of the mixture was carried out under conventional conditions in three steps in a laboratory tangential mixer. Test specimens were produced from all the mixtures by optimum vulcanization under pressure at 160° C., and with these test specimens material properties typical for the rubber industry were determined using the test methods stated in the following.

Rebound resilience at RT and 70° C. in accordance with DIN 53 512

Tensile strength and elongation at break at room temperature in accordance with DIN 53 504

Dynamic storage modulus E' at 8% elongation and a maximum loss factor tan δ (tangent delta) at 55° C. from elongation-dependent measurement ("strain sweep") in accordance with DIN 53513

Abrasion at room temperature in accordance with DIN 53 516 or DIN/ISO 4649

Glass transition temperature $T_g$ of the rubber mixture by means of DSC in accordance with ISO 11357-1 and 11357-21987 p. 519-527 (calibrated DSC with low temperature device, calibration according to apparatus type and manufacturer's instructions, sample in an aluminum crucible with an aluminum lid).

TABLE 1

| | Unit | C1 | C2 | C3 | C4 | C5 | E1 | E2 | E3 | C6 | E4 | E5 | E6 |
|---|---|---|---|---|---|---|---|---|---|---|---|---|---|
| Constituents | | | | | | | | | | | | | |
| NR[a] | phr | 100 | 100 | 100 | 100 | 100 | 100 | 100 | 100 | 100 | 100 | 100 | 100 |
| Silica[b] | phr | 60 | 60 | 60 | 60 | 60 | 60 | 60 | 60 | 60 | 60 | 60 | 60 |
| HC resin[c] | phr | — | — | — | — | 10 | 30 | 50 | 70 | — | — | — | — |
| HC resin[d] | phr | — | — | — | — | — | — | — | — | 10 | 30 | 50 | 70 |
| C$_5$ resin[e] | phr | — | 10 | 30 | 50 | — | — | — | — | — | — | — | — |
| Antiageing[f] | phr | 4 | 4 | 4 | 4 | 4 | 4 | 4 | 4 | 4 | 4 | 4 | 4 |
| Stearic acid | phr | 2.5 | 2.5 | 2.5 | 2.5 | 2.5 | 2.5 | 2.5 | 2.5 | 2.5 | 2.5 | 2.5 | 2.5 |
| ZnO | phr | 2.5 | 2.5 | 2.5 | 2.5 | 2.5 | 2.5 | 2.5 | 2.5 | 2.5 | 2.5 | 2.5 | 2.5 |
| Silane[g] | phr | 4.3 | 4.3 | 4.3 | 4.3 | 4.3 | 4.3 | 4.3 | 4.3 | 4.3 | 4.3 | 4.3 | 4.3 |
| Accel.[h] | phr | 4 | 4 | 4 | 4 | 4 | 4 | 4 | 4 | 4 | 4 | 4 | 4 |
| Sulfur | phr | 2 | 2 | 2 | 2 | 2 | 2 | 2 | 2 | 2 | 2 | 2 | 2 |
| Properties | | | | | | | | | | | | | |
| Rebound RT | % | 50 | 46 | 38 | 36 | 47 | 48 | 27 | 16 | 46 | 35 | 22 | 12 |
| Rebound 70° C. | % | 62 | 61 | 60 | 57 | 63 | 64 | 68 | 56 | 61 | 62 | 56 | 53 |
| Diff. rebound | | 12 | 15 | 22 | 31 | 16 | 23 | 33 | 41 | 14 | 27 | 34 | 41 |
| Tensile strength | MPa | 27 | 26 | 22 | 17 | 24 | 23 | 19 | 13 | 25 | 23 | 19 | 14 |
| Elongation at break | % | 566 | 611 | 651 | 653 | 588 | 681 | 787 | 651 | 593 | 674 | 722 | 686 |
| DIN abrasion | mm$^3$ | 140 | 144 | 185 | 360 | 145 | 177 | 360 | 630 | 161 | 176 | 329 | 555 |
| E' (8%) | MPa | 6.5 | 5.2 | 3.6 | 2.7 | 4.9 | 3.5 | 2.5 | 1.3 | 5.1 | 3.6 | 2.2 | 1.7 |
| T$_g$ | ° C. | −61 | −59 | −57 | −55 | −59 | −56 | −54 | −51 | −58 | −55 | −51 | −48 |

Substances used:
[a] NR: Natural rubber, TSR
[b] Silica: VN3, Evonik
[c] Hydrocarbon resin: Piccotac™ 1095, Eastman Chemical Company, aliphatic C5-hydrocarbon resin, 0 wt. % aromatic monomers Mw = 1,700 g/mol, Mc = 3,500 g/mol; SP = 94° C.; Q = 0.0269 [° C. · mol/g]
[d] Hydrocarbon resin: Piccotac™ 6095-E, Eastman Chemical Company, 60 wt. % aliphatic C$_5$ monomers, 40 wt. % aromatic monomers; Mw = 1,700 g/mol, Mc = 4,000 g/mol; SP = 98° C.; Q = 0.0245 [° C. · mol/g]
[e] C5 resin: Escorez™ 1102, Exxon Mobil Chemical, 100 wt. % aliphatic C$_5$ monomers; Mw = 4,500 g/mol Mc = 15,000 g/mol, SP = 100° C.; Q = 0.00667
[f] Antiageing agent: 6PPD + antiozonant wax
[g] Silane: 75 wt. % S2, TESPD
[h] Accelerators: DPG and CBS As can be seen from Table 1, rubber mixtures E1 to E6 according to the invention have, compared with reference mixture C1 and comparison mixtures C3 and C4 with a hydrocarbon resin which has a lower quotient Q (softening point [° C.]/centrifuge average Mc [g/mol]), a higher performance level with respect to the target conflict of rolling resistance properties and wet grip properties, which can be seen from the increased difference in the rebound resiliences (rebound resilience at 70° C. minus rebound resilience at RT). The lower the value for the rebound resilience at room temperature, the better the wet grip properties. The higher the rebound resilience at 70° C., the better the rolling resistance properties of the rubber mixture. Furthermore, the comparison of rubber mixtures E1 and E2 or E4 and E5 according to the invention with C3 and C4, that is to say the comparative examples with in each case the same amount of resin, shows that the elongation at break was improved with the same or improved abrasion properties.

Furthermore, it can be seen in Table 1 that the hydrocarbon resins as used in high amounts in the variants according to the invention, see, in particular, E2, E3 and E5 and E6, have the effect of a greater shift in the glass transition temperature of the rubber mixture, starting from the glass transition temperature of natural rubber (see C1), compared with the comparison resin. This indicates a surprisingly good solubility of the hydrocarbon resins according to claim 1 in natural rubber.

The foregoing description of the embodiments has been provided for purposes of illustration and description. Example embodiments are provided so that this disclosure will be sufficiently thorough, and will convey the scope to those who are skilled in the art. Numerous specific details are set forth such as examples to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:
1. A sulfur-crosslinkable rubber mixture comprising:
from 40 to 100 phr of at least one natural and/or synthetic polyisoprene;
15 phr or more of at least one hydrocarbon resin which is built up to the extent of 50 to 100 wt. % from aliphatic C$_5$ monomers and to the extent of 0 to 50 wt. % from further monomers, wherein the hydrocarbon resin according to formula I) has a Q of from 0.015 [° C.·mol/g] to 0.050 [° C.·mol/g], wherein formula I) is defined as Q=softening point [° C.]/centrifuge average Mc [g/mol]; and,
70 to 250 phr of at least one silica;

wherein, after vulcanization, the sulfur-crosslinkable rubber mixture has an elongation at break of from 651% to 722% at room temperature, in accordance with DIN 53 504.

2. The sulfur-crosslinkable rubber mixture of claim 1 comprising 15 to 300 phr of the hydrocarbon resin.

3. The sulfur-crosslinkable rubber mixture of claim 1 comprising 36 to 100 phr of the hydrocarbon resin.

4. The sulfur-crosslinkable rubber mixture of claim 1 wherein the further monomer(s) is or are selected from the group of unsaturated compounds, which can be polymerized cationically, comprising aromatics and/or unsaturated terpenes and/or alkenes and/or cycloalkenes.

5. The sulfur-crosslinkable rubber mixture of claim 4 wherein the further monomer(s) is or are selected from the group consisting of alpha-methylstyrene and/or styrene and/or vinyltoluene and/or indene and/or coumarone and/or methylindene and/or methylcoumarone and/or phenol and/or olefins.

6. The sulfur-crosslinkable rubber mixture of claim 1 wherein the hydrocarbon resin has a softening point according to ASTM E 28 (ring and ball) of from 60 to 99° C.

7. The sulfur-crosslinkable rubber mixture of claim 1 wherein the hydrocarbon resin has a molecular weight Mw (weight average) of from 500 to 4,000 g/mol and a centrifuge average Mc of from 2,500 to 10,000 g/mol.

8. The sulfur-crosslinkable rubber mixture of claim 1 comprising 80 to 180 phr of at least one silica.

9. A vehicle pneumatic tire comprising the sulfur-crosslinkable rubber mixture of claim 1.

10. The vehicle pneumatic tire as claimed in claim 9, wherein the sulfur-crosslinkable rubber mixture is comprised in a tread of the vehicle pneumatic tire.

* * * * *